(12) United States Patent
Arimilli et al.

(10) Patent No.: US 7,039,760 B2
(45) Date of Patent: May 2, 2006

(54) PROGRAMMING MEANS FOR DYNAMIC SPECIFICATIONS OF CACHE MANAGEMENT PREFERENCES

(75) Inventors: Ravi Kumar Arimilli, Austin, TX (US); John David McCalpin, Round Rock, TX (US); Francis Patrick O'Connell, Austin, TX (US); William John Starke, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 493 days.

(21) Appl. No.: 10/425,443

(22) Filed: Apr. 28, 2003

(65) Prior Publication Data

US 2004/0215888 A1    Oct. 28, 2004

(51) Int. Cl.
*G06F 12/00* (2006.01)

(52) U.S. Cl. .................. 711/118; 711/133; 711/136; 711/159

(58) Field of Classification Search ........ 711/133–134, 711/159–160
See application file for complete search history.

(56) References Cited

U.S. PATENT DOCUMENTS 5,594,886 A * 1/1997 Smith et al. ................. 711/136
5,715,427 A * 2/1998 Barrera et al. .............. 711/136
5,778,430 A * 7/1998 Ish et al. ..................... 711/133

(Continued)

OTHER PUBLICATIONS

Starke, Cache Allocation Mechanism for Saving Elected Unworthy Member via Substitute Victimization and Imputed Worthiness of Substitute Victim Member.

(Continued)

*Primary Examiner*—Nasser Moazzami
(74) *Attorney, Agent, or Firm*—Duke W. Yee; Mark E. McBurney

(57) ABSTRACT

A method and apparatus for managing cache lines in a data processing system. A special purpose register is employed in which this register may be manipulated by user code and operating system code to set preferences, such as a level 2 cache management policy preference for an application thread. These preferences may be dynamically set and an arbitration mechanism is employed to best satisfy preferences of multiple threads with a single aggregate preference. Members are represented using a least recently used tree. The least recent used tree has a set of nodes forming a path to member cache lines in a hierarchical structure. A state of a selected node is selectively biased within the set of nodes in the least recently used tree. At least one node on a level below the selected node is eliminated from being selected in managing the cache lines. In this manner, members can be biased against or for selection as victims when replacing cache lines in a cache memory.

25 Claims, 13 Drawing Sheets

U.S. PATENT DOCUMENTS

| | | | |
|---|---|---|---|
| 5,781,924 A * | 7/1998 | Zaitzeva et al. | 711/131 |
| 5,963,972 A * | 10/1999 | Calder et al. | 711/129 |
| 6,434,670 B1 * | 8/2002 | Arimilli et al. | 711/128 |
| 6,725,341 B1 | 4/2004 | Peir et al. | |
| 6,738,888 B1 | 5/2004 | Chauvel | |
| 6,745,291 B1 * | 6/2004 | York | 711/128 |
| 2002/0069328 A1 | 6/2002 | Chauvel | |
| 2002/0069339 A1 | 6/2002 | Lasserre et al. | |
| 2004/0268099 A1 | 12/2004 | Smith et al. | |

OTHER PUBLICATIONS

Cargnoni et al., Cache Allocation Mechanism for Saving Multiple Elected Unworthy Members via Substitute Victimization and Imputed Worthiness of Multiple Substitute Victim Members.

Cargnoni et al., Cache Allocation Mechanism for Biasing Subsequent Allocations Based Upon Cache Directory State.

* cited by examiner

PROGRAMMING MEANS FOR DYNAMIC SPECIFICATIONS OF CACHE MANAGEMENT PREFERENCES

CROSS REFERENCE TO RELATED APPLICATIONS

The present invention is related to the following applications entitled: "Cache Allocation Mechanism for Saving Elected Unworthy Member via Substitute Victimization and Imputed Worthiness of Substitute Victim Member", Ser. No. 10/425,442, "Cache Allocation Mechanism for Saving Multiple Elected Unworthy Members via Substitute Victimization and Imputed Worthiness of Multiple Substitute Victim Members", Ser. No. 10/425,444, and "Cache Allocation Mechanism for Biasing Subsequent Allocations Based Upon Cache Directory State" Ser. No. 10/425,459, all filed even date hereof, assigned to the same assignee, and incorporated herein by reference.

BACKGROUND OF THE INVENTION

1. Technical Field

The present invention relates generally to an improved data processing system, and in particular, to an improved method and apparatus for caching data in a memory.

2. Description of Related Art

Most early data processing systems consisted basically of a central processing unit, a main memory, and some sort of secondary input/output ("I/O") capability. In these earlier systems, the main memory was the limiting element. Typically, the main memory was designed first and the CPU was then created to match the speed of the memory. This matching was performed to optimize the processing speed and is necessary even with today's high speed computers. Over time, logic circuit speeds increased along with the capacity requirements of main memory. With the need for increasing capacity in the main memory, the speed of the main memory could not keep up with the increasing speed of the CPU. Consequently, a gap developed between the main memory and the processor cycle time, which resulted in un-optimized processing speeds. As a result, a cache memory was developed to bridge the gap between the memory and the processor cycle time.

Using a cache to bridge the performance gap between a processor and main memory has become important in data processing systems of various designs from personal computers to work stations to data processing systems with high performance processors. A cache memory is an auxiliary memory that provides a buffering capability through which a relatively slow main memory can interface with a processor at the processor's cycle time to optimize the performance of the data processing system. Requests are first sent to the cache to determine whether the data or instructions requested are present in the cache memory. A "hit" occurs when the desired information is found in the cache. A "miss" occurs when a request or access to the cache does not produce the desired information. In response to a miss, one of the cache "lines" is replaced with a new one. The method to select a line to replace is called a replacement policy.

A number of different schemes for organizing a cache memory exist. For example, a fully associative mapping organization may be employed whereby a data address may exist in any location in the cache, or a direct mapping scheme may be employed in a cache memory whereby a data address may exist in only one location in the cache. A set associative scheme may be employed by partitioning the cache into distinct classes of lines, wherein each class contains a small fixed number of lines. This approach is somewhere between a direct mapped and a full associative cache. The classes of lines are usually referred to as "congruence classes." The lines in a congruence class are usually referred to as sets (which indicate the number of locations an address can reside) in a congruence class in a set associative cache.

One generally used type of replacement policy is the least-recently-used (LRU) policy. An LRU policy is built upon the premise that the least recently used cache line in a congruence class is the least worthy of being retained. So, when it becomes necessary to evict a cache line to make room for a new one, an LRU policy chooses as a victim a cache line which is the least recently accessed set (or member) within a congruence class.

For an LRU policy, two types of operations must be carried out against the LRU state (which is maintained for each congruence class in a cache).

A most-recently-used-update (MRU-update) operation typically occurs due to a cache hit. It adjusts the LRU state such that the "hit" member is ordered ahead of all other members in that congruence class, establishing the cache line in that member position as the most worthy member in the congruence class.

A least-recently-used-victim-selection (LRU-victim-selection) operation typically occurs when a cache miss requires that a member be allocated to hold a cache line arriving from elsewhere in the storage hierarchy. The operation determines which cache line is the least worthy of being retained in the congruence class, evicts that cache line, and places the newly arriving cache line in its member position.

Several factors complicate the behavior of LRU replacement policies in multi-level cache hierarchies, particularly when those hierarchies contain nth level caches that are shared by multiple structures at level n−1. For example, a processor may contain a first level instruction cache and a first level data cache. These may be backed by a second level cache that includes both instructions and data. Such a structure is designed for the following purpose: so that processor requests for cache lines that miss in the first level caches have a high likelihood of being found in the second level cache.

As described earlier, the LRU replacement policy in the first level caches would update as most-recently-used those cache lines that are used most often by the processor. Cache lines that are less important (or worthy) to the processor, since they are used less often, would be less likely to be marked as most-recently-used. Thus, the more frequently used lines tend to remain in the first level cache, while the less frequently used lines tend to be evicted from the first level cache.

The LRU policy in the second level cache would update as most-recently-used those cache lines that are requested from the second level cache when a first level cache miss occurs. These lines would tend to be those lines which were evicted from the first level cache, and are less worthy to the processor than the cache lines which tend to hit in the first level caches. Thus, the cache lines that most often are not found in the first level caches, but are repeatedly needed by the processor, are the cache lines most likely to remain in the second level cache, due to the fact that they are more likely to be beneficially affected by MRU-updates.

Ironically then, the cache lines which are most worthy to the processor are less likely to benefit from MRU-updates in the second level cache, and hence, are more likely to be evicted from the second level cache than the cache lines which are less worthy to the processor.

This behavior can be quite pronounced when multiple first level (or n−1 level) caches are backed by the same second level (or nth level) cache, especially when those first level caches have differing patterns of miss traffic. For example, many applications have small instruction footprints but high rates of data turnover (i.e., data footprints that exceed the size of the second level cache), resulting in very few first level instruction cache misses relative to first level data caches misses, and requiring that significantly less capacity in the second level cache be allocated for instructions than for data.

In such an application, even though instructions require a smaller portion of the second level cache, the fact that the first level instruction cache seldom misses, combined with the fact that the first level data frequently misses and that the data footprint exceeds the capacity of the second level cache, the instructions, so well behaved in the level instruction cache, would tend to be evicted from the larger, shared, second level cache. Such application behaviors will hereafter be referred to as "unbalanced" caching behaviors.

Another type of application might have an instruction footprint that is too large to be contained in the first level instruction cache and a data footprint that is too large to be contained in the first level data cache. In this case, both instruction and data caches miss frequently enough relative to each other to better balance the likelihood of MRU-updates in the second level cache for instruction cache lines versus for data cache lines. The natural pattern of requests fairly balances the allocation of second level cache capacity between instruction cache lines and data cache lines, with this allocation more accurately representing the true worthiness of these cache lines to the processor. Such application behaviors will hereafter be referred to as "balanced" caching behaviors.

Inclusion occurs if a block of data is present in an L1 cash of a given processing unit, and this block of data also is present in other caches, such as the L2 and L3 caches, of that processing unit. If a system structure requires the property of inclusion between the second level cache and the first level caches, there can be significant performance consequences to applications with unbalanced caching behaviors. When cache lines, well behaved in a first level cache and important to the processor, are evicted from the second level cache (since they seldom receive the benefit of an MRU-update in the second level cache), inclusion dictates that they must be evicted from the first level cache as well.

In some cases, this has been overcome by limiting inclusion to data, and architecting software managed coherency schemes for instructions, or in other cases, by directly snooping first level caches. As the number of processors in a system increases, such schemes become less and less viable.

Further, if a second level cache is shared by multiple processors (or processing threads), the caching (i.e., performance) behaviors can be negatively affected by the level of "balance" between instructions and data within the application thread on any given processor as well as the relative "balance" between the application threads as a whole. Conversely, caching behaviors can be positively impacted when multiple application threads share data or instructions.

Those of ordinary skill in the art will recognize numerous schemes for biasing to overcome the consequences of unbalanced behaviors in fully inclusive caches, both within an application thread or amongst multiple such threads. Such schemes typically involve establishing multiple cache partitions and restricting the use of those partitions to certain types of operations. This can be accomplished by augmenting a standard replacement policy, such as LRU, to respect the partitions.

For example, a small fixed size region of the second level cache can be restricted for use by instruction cache lines only, with the remainder allocated to other (e.g., data) cache lines. Such an approach provides benefit to an "unbalanced" application. Such an approach might be detrimental to a well balanced application whose instruction footprint exceeds the capacity of the small fixed size region. Increasing the size of the region dedicated for instructions in response to this concern might be detrimental to the "unbalanced" application or to a "balanced" application with a larger ratio of data footprint size relative to instruction footprint size, since increasing the instruction region would decrease the data region.

In the case of multiple processors, a second level cache might be divided into equal sized partitions, one for each processor. Such an approach can possibly provide benefit when "unbalanced" and "balanced" applications of varying degrees share a second level cache. Such an approach can be detrimental when one application has significantly less demand for the second level cache than another application, but that other application is prevented from utilizing any of the second level cache outside of its allotted partition. Such an approach might also reduce the synergy that might otherwise occur when multiple application threads exhibit a high degree of sharing of instructions and/or data.

While static partitioning schemes in shared, second level, inclusive, caches can improve performance for applications with unbalanced caching behaviors, these same schemes can be detrimental to the performance of other applications with different levels of balance or sharing.

Therefore, it would be advantageous to have an improved method, apparatus, and computer instructions to dynamically manage caching behavior in a data processing system to improve performance.

SUMMARY OF THE INVENTION

The present invention provides a method and apparatus for managing cache lines in a data processing system. A special purpose register is employed in which this register may be manipulated by user code and operating system code to set preferences, such as a level 2 cache management policy preference for an application thread. These preferences may be dynamically set and an arbitration mechanism is employed to best satisfy preferences of multiple threads with a single aggregate preference. Members are represented using a least recently used tree. The least recent used tree has a set of nodes forming a path to member cache lines in a hierarchical structure. A state of a selected node is selectively biased within the set of nodes in the least recently used tree. At least one node on a level below the selected node is eliminated from being selected in managing the cache lines. In this manner, members can be biased against or for selection as victims when replacing cache lines in a cache memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
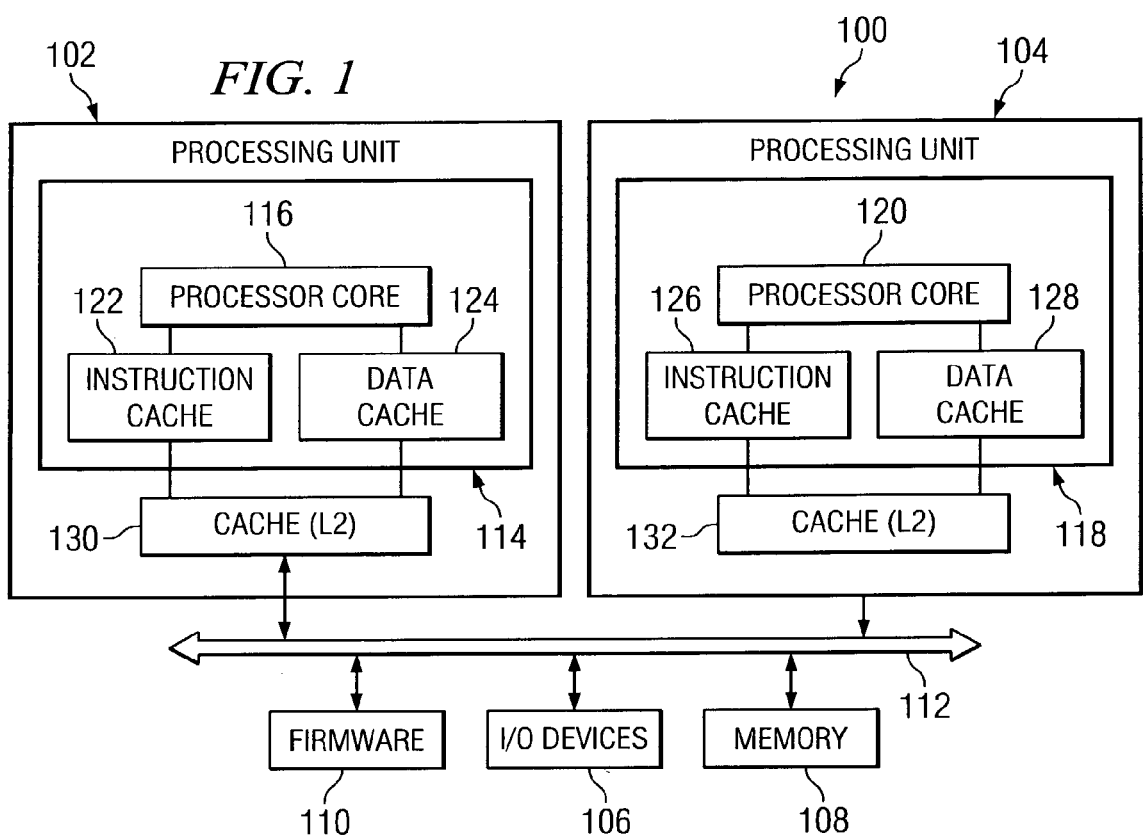
FIG. 1 is a block diagram of a data processing system in which a preferred embodiment of the present invention may be implemented.

With reference now to the figures and in particular with reference to FIG. 1, a block diagram of a data processing system is depicted in which a preferred embodiment of the present invention may be implemented. As illustrated, Data processing system 100 is an example of a conventional multi-processor computer system. Data processing system 100 has several processing units, two of which, processing unit 102 and processing unit 104 are depicted. These processing units are connected to various peripheral devices, including input/output (I/O) devices 106 used to communicate with a user, memory 108 used by the processing units to carry out program instructions, and firmware 110 whose primary purpose is to seek out and load an operating system from one of the peripherals whenever the computer is first turned on. I/O devices 106 may take various forms, such as a display monitor, keyboard, and permanent storage device.

Processing units 102 and 104 communicate with the peripheral devices by various means, including, for example, a generalized interconnect or bus 112. Data processing system 100 may have many additional components which are not shown, such as serial and parallel ports for connection to devices, such as modems or printers. Those of ordinary skill in the art will further appreciate that there are other components that might be used in conjunction with those shown in the block diagram of FIG. 1. For example, a display adapter might be used to control a video display monitor, and a memory controller may be used to access memory 108. The data processing system also can have more than two processing units.

In a symmetric multi-processor (SMP) computer, all of the processing units are generally identical. In other words, the processors all use a common set or subset of instructions and protocols to operate, and generally have the same architecture. A typical architecture is shown in FIG. 1. In these examples, a processing unit 102 includes integrated chip 114, which contains processor core 116, and processing unit 104 contains integrated circuit 118, which contains processing core 120, instruction cache 126, and data cache 128. Processor cores 116 and 124 include registers and execution units. These components are used to carry out program instructions to operate data processing system 100.

As illustrated, processing unit 102 and processing unit 104 also include caches, such as instruction cache 122, data cache 124, instruction cache 126, and data cache 128, within integrated circuits 114 and 118 in FIG. 1. These caches are implemented using high speed memory devices. Caches are commonly used to temporarily store values that might be repeatedly accessed by a processor, to speed up processing by avoiding the longer step of loading the values from memory 108. These caches also are referred to as "on-board" when they are integrally packaged with the processor core on a single integrated chip. In these examples, the caches located within integrated circuit 114 and integrated circuit 118 are level 1 (L1) caches. Each cache is associated with a cache controller (not shown) that manages the transfer of data between the processor core and the cache memory.

A processing unit can include additional caches. For example, processing unit 102 includes cache 130 and processing unit 104 includes cache 132, which are referred to as level 2 (L2) caches because these memories support the on-board or L1 caches. In other words, cache 130 and cache 132 act as intermediaries between memory 108 and the on-board L1 caches: instruction cache 122, data cache 124, instruction cache 126, and data cache 128. These L2 caches can store a much larger amount of information, such as instructions and data, than the on-board caches can, but with a longer access penalty. For example, cache 130 and cache 132 may be integrated in chips having a storage capacity of 256 or 512 kilobytes, while instruction cache 122 and data cache 124 in processing unit 102 and instruction cache 126 and data cache 128 in processing unit 104 may have 64 kilobytes of total storage.

As illustrated, both cache 130 and 132 are connected to bus 112. All loading of information from memory 108 into processor core 116 passes through cache 130, while all loading of information into processor core 120 passes through cache 132. Although FIG. 1 depicts only a two-level cache hierarchy, multi-level cache hierarchies can be provided where there are many levels of serially connected caches. For example, L3, L4, and L5 caches may be used.

In an SMP computer, to providing a coherent memory system is important. In other words, it is important to cause write operations to each individual memory location to be serialized in some order for all processors. For example, assume a location in memory is modified by a sequence of write operations to take on the values: 1, 2, 3, 4. In a cache coherent system, all processors will observe the writes to a given location to take place in the order shown. However, it is possible for a processing element to miss a write to the memory location. A given processing element reading the memory location could see the sequence 1, 3, 4, missing the update to the value 2. A system that implements these properties is said to be "coherent". Virtually all coherency protocols operate only to the granularity of the size of a cache block. That is to say, the coherency protocol controls the movement of and write permissions for data on a cache block basis and not separately for each individual memory location.

A number of protocols and techniques for achieving cache coherence are known. At the heart of all these mechanisms for maintaining coherency is the requirement that the protocols allow only one processor to have a "permission" that allows a write to a given memory location (cache block) at any given point in time. As a consequence of this requirement, whenever a processor attempts to write to a memory location, the processor must first inform all other processors of its desire to write the location and receive permission from all other processors to carry out the write. The key issue is that all other processors in the system must be informed of the write by the initiating processor before the write occurs. Furthermore, if a block is present in the L1 cache of a given processing unit, this block is also present in the L2 and L3 caches of that processing unit. This property is known as inclusion and is well known to those skilled in the art.

To implement cache coherency in a system, the processors communicate over a common generalized interconnect, such as bus 112. The processors pass messages over the interconnect indicating their desire to read or write memory locations. When an operation is placed on the interconnect, all of the other processors "snoop" (monitor) this operation and decide if the state of their caches can allow the requested operation to proceed and if so, under what conditions. There are several bus transactions that require snooping and follow-up action to honor the bus transactions and maintain memory coherency. The snooping operation is triggered by the receipt of a qualified snoop request, generated by the assertion of certain bus signals. Instruction processing is interrupted only when a snoop hit occurs and the snoop state machine determines that an additional cache snoop is required to resolve the coherency of the offended sector.

Figure 2:
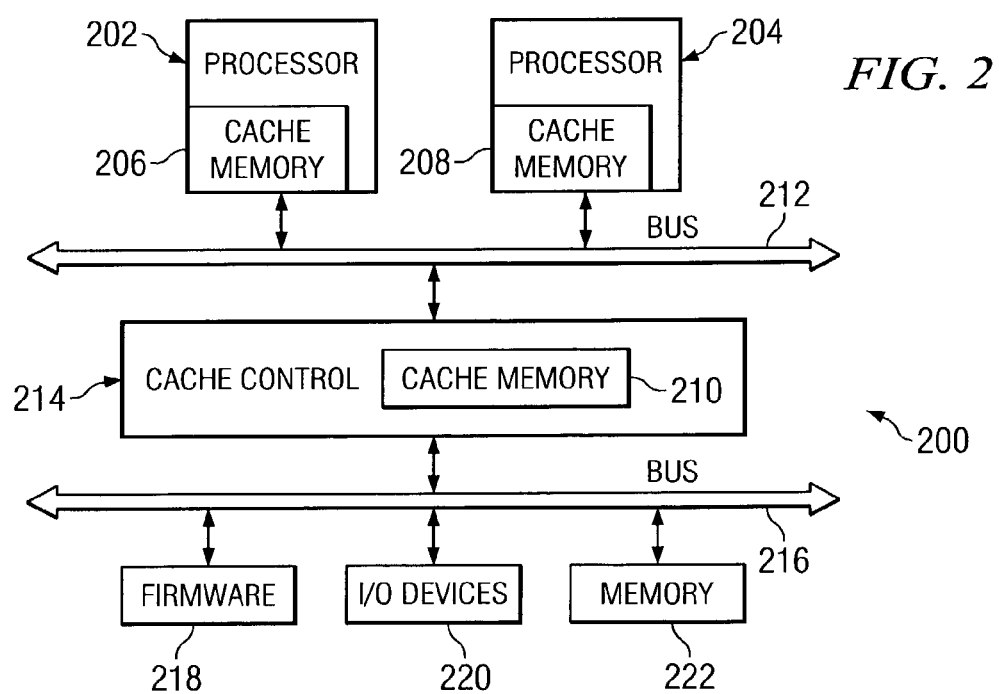
FIG. 2 is a diagram of another data processing system in which the present invention may be implemented.

With reference now to FIG. 2, a diagram of another data processing system is depicted in accordance with a preferred embodiment of the present invention. The processes and apparatus of the present invention may also be implemented within data processing system 200. This particular example, illustrated a shared L2 cache, while data processing system 100 in FIG. 1 illustrated unshared caches.

In this example, data processing system 200 includes two processors, processor 202 and processor 204. Cache memory 206 and cache memory 208 are cache memories located within processor 202 and processor 204, respectively. In this example, cache memory 210 is a level 2 cache memory that is shared by both processors. Access to this cache memory is provided by bus 212. Cache control 214 contains the logic for handling cache lines within memory 210 in response to requests from processors 202 and 204. Cache control 214 is connected to other components through bus 216. For example, firmware 218, I/O devices 220 and memory 222 are connected to bus 216.

Data processing system 100 and data processing system 200 include mechanisms for handling cache lines. A cache line is a unit of data that is retrieved from memory to a cache. A cache line is typically the smallest unit of data that may be sent from a memory to a cache. The present invention provides a method, apparatus, and computer instructions for supplementing least recently used (LRU) policies applied to handling cache lines in a cache.

An LRU policy, by definition, must maintain an ordered list of all members within each congruence class. The vector consists of one bit for each possible pair of entities. The bit indicates the relative ordering within the pair. That is, for a given pair (i, j) the bit might be set to a "one" value if entity j precedes entity i, and the bit might be cleared to a "zero" value if entity i precedes entity j.

Figure 3:
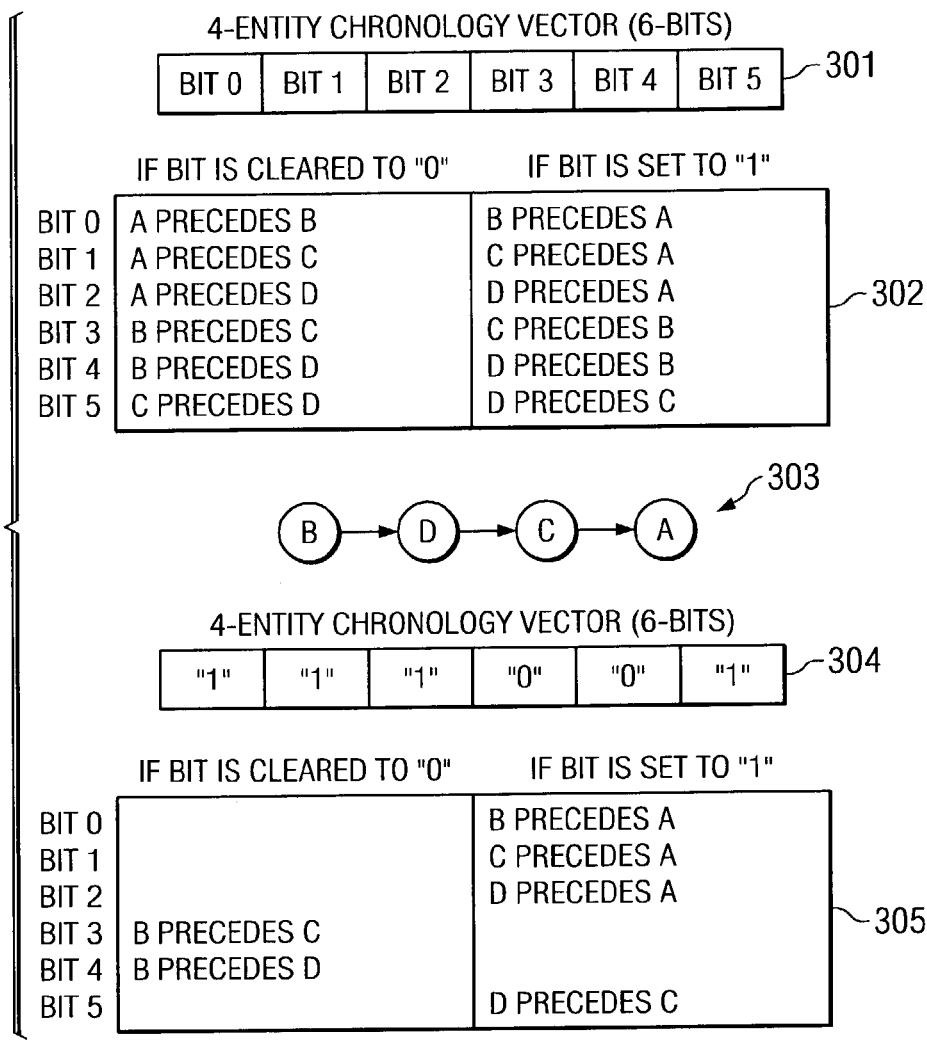
FIG. 3 is a diagram of components used in ordering entities.

For example, referring now to FIG. 3, components used in ordering entities are illustrated. Chronology vector 301 indicates an ordering between four entities (a, b, c, d) and consists of six bits. Referring to table 302, bit 0 indicates the ordering between entities a and b, bit 1 indicates the ordering between entities a and c, bit 2 indicates ordering between a and d, bit 3 indicates ordering for b and c, bit 4 is used in ordering b and d, and bit 5 indicates ordering between c and d.

To specify the ordering of members in ordering 303 as follows: b, d, c, a, the vector 304 would have the value: "111001", indicating an order specified by the rules 305 for each chronology bit.

In general, a vector of chronology bits for determining the ordering amongst n entities requires $(n \times (n-1))/2$ bits.

Applying this technique to implement a "true" LRU policy for a 2-way associative cache requires a 1-bit vector; or for a 3-way cache requires a 3-bit vector; or 4-way: 6-bits; or 5-way: 10-bits; or 8-way: 28-bits; or 16-way: 120-bits.

While chronology bits do not provide the most efficient possible bit-encoding (e.g., an encoding requiring the smallest number of bits), they do possess attributes ideally suited to a fast and inexpensive circuit implementation.

With a chronology vector implementation, an MRU-update operation is accomplished by setting a subset of the bits in the vector to a constant pattern (associated with the updated member) while leaving the other bits in the vector unchanged. The subset is comprised of the n−1 bits (where n is the associativity of the cache) which define the ordering between the updated member and each of the other members in the congruence class.

Figure 4A:
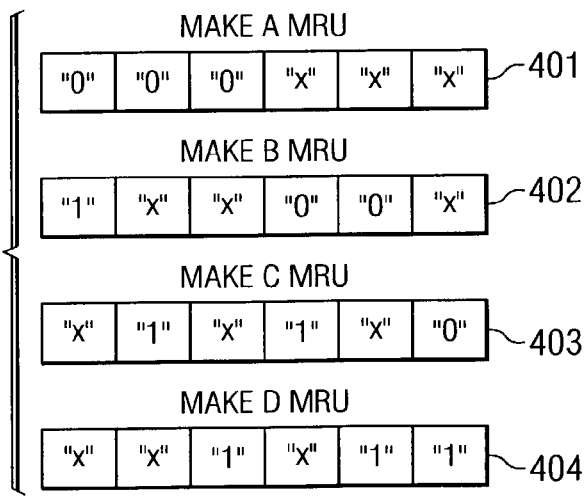
FIG. 4A is a diagram of constant patterns.
Figure 4B:
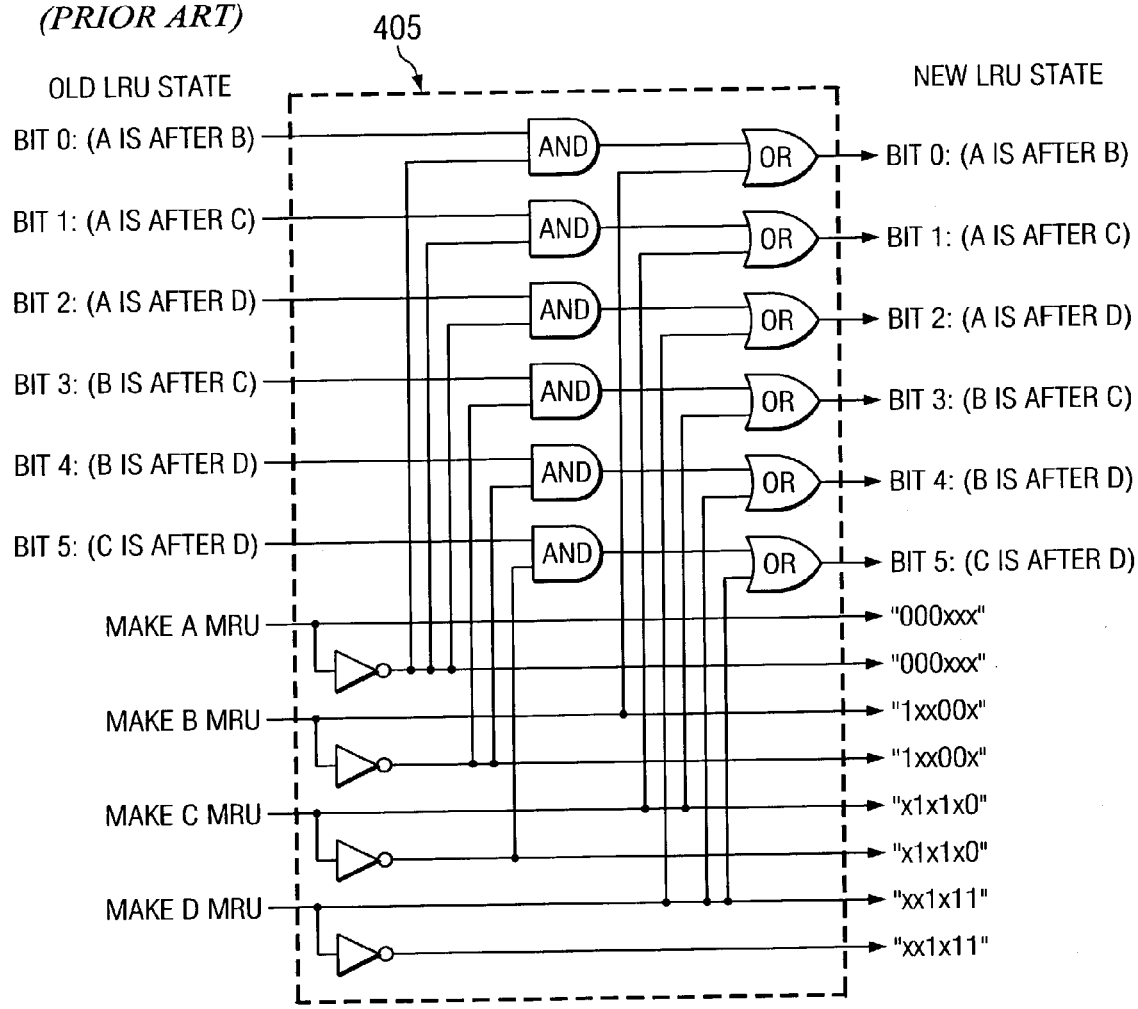
FIG. 4B is a circuit diagram of a known MRU-update function.

For example, referring now to FIG. 4A, the constant patterns are shown for a 401, b 402, c 403, and d 404. Turning next to FIG. 4B, circuit diagram 405 illustrates the MRU-update function in a manner familiar to those skilled in the art. Constant patterns 401, 402, 403, and 404, from FIG. 4A are used to annotate the control lines in circuit diagram 405 in FIG. 4B to associate each constant pattern with the set of control lines that establish that pattern into the LRU state.

With a chronology vector implementation, an LRU-victim-selection operation is accomplished by implementing an equation for each member position. The equation for a given member tests the same subset of n−1 bits (described above) associated with that member in the MRU-update operation, i.e., those bits which define the ordering between the member and each of the other members in the congruence class. The equation compares the tested bits against a constant pattern, returning "true" if there is a match, and returning "false" if there is not a match. One and only one of the equations will return a "true" value. The member position associated with that equation is the victim member position.

Figure 5A:
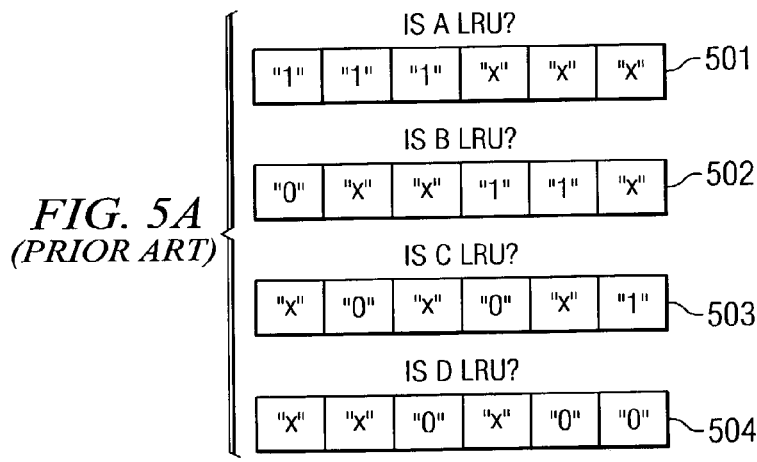
FIG. 5A is a diagram of constant patterns.
Figure 5B:
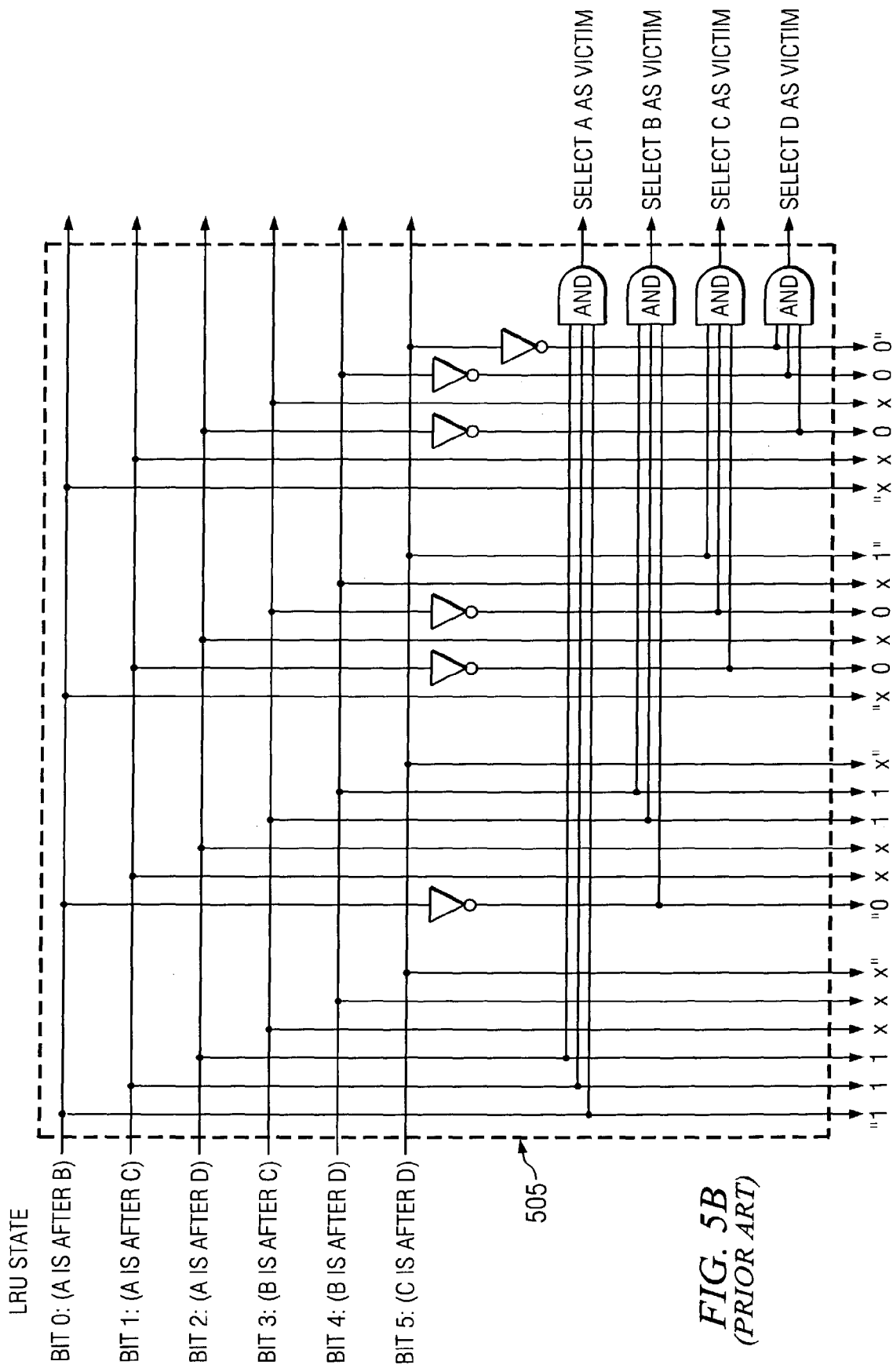
FIG. 5B is a circuit diagram of a known LRU-victim-selection function.

For example, referring now to FIG. 5A, the constant patterns are shown for a 501, b 502, c 503, and d 504. With reference to FIG. 5B, circuit diagram 505 illustrates the LRU-victim-selection function in a manor familiar to those skilled in the art. Constant patterns 501, 502, 503, and 504, from FIG. 5A are used to annotate the information lines in circuit diagram 505 in FIG. 5B to associate each constant pattern with the set of information lines that feeds the constant comparator equation for that pattern.

As associativity increases the chronology vector technique can become prohibitively expensive. Those skilled in the art will recognize that less expensive "pseudo-LRU" policies are possible, which policies are roughly equal in to "true" LRU behavioral value, but may be implemented in hardware with fewer bits required to track LRU state.

One such policy, well known in the art, is the tree-based pseudo-LRU approach. In this hierarchical approach, a set of multiple chronology vectors are organized as a tree of arbitrary depth. For non-leaf nodes of the tree, the number of branches from the node is equal to the number of entities ordered by the vector. Each leaf node of the tree defines the order amongst a subset of the members in a congruence class equal in number to the ordering capacity of the vector.

Figure 6:
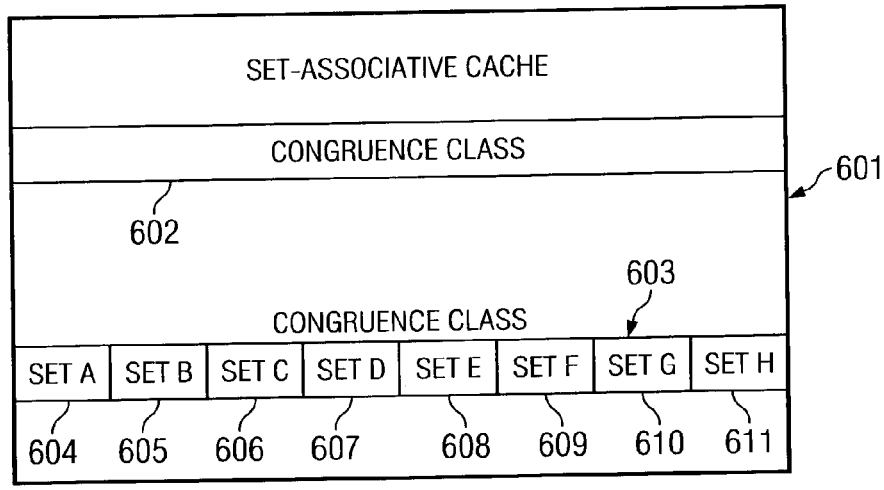
FIG. 6 is a diagram of an 8-way associative cache.

To illustrate this, referring now to FIG. 6, an 8-way associative cache 601 is shown. Cache 601 is comprised of multiple congruence classes 602 and 603, which are typically selected by a subset of the address of the cache line being referenced. Each congruence class is comprised of eight members, member A 604, member B 605, member C 606, member D 607, member E 608, member F 609, member G 610, and member H 611.

Often, tree-based LRU implementations are comprised of single bit (2-entity) chronology vectors. For example, referring now to FIG. 7, examples of tree based LRU structures are illustrated. In this example, vector 700 forms the basis for each nodes in a binary tree 702, which is 3 levels deep in this example. Binary tree 702 contains nodes 704, 706, 708, 710, 712, 714, and 716. Seven single bit vectors, vectors 718, 720, 722, 724, 726, 728, and 730, are provided to track the state for a binary-tree LRU scheme governing the 8-way associative cache with member positions A 732, B 734, C 736, D 738, E 740, F 742, G 744, and H 746.

Figure 7:
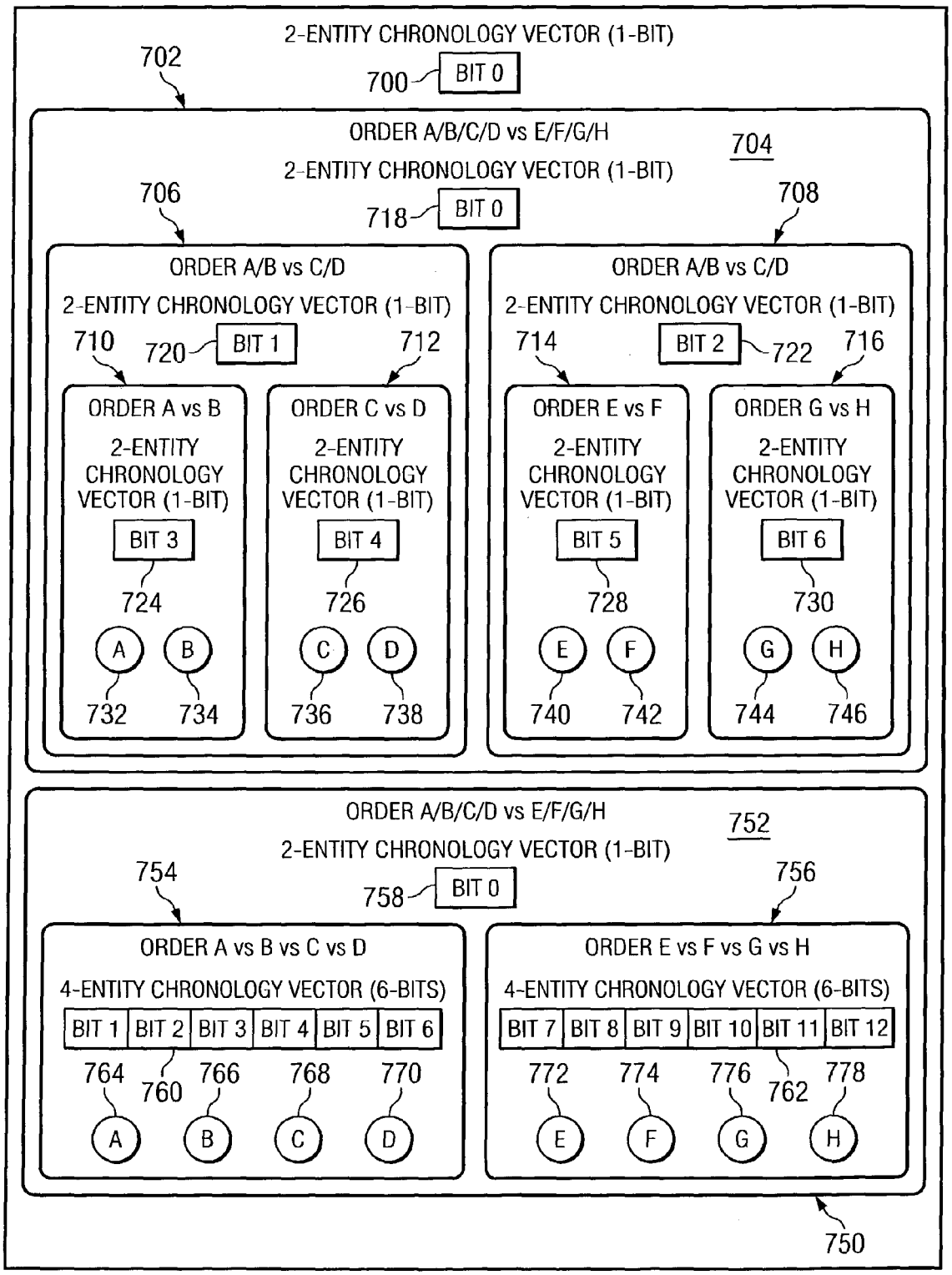
FIG. 7 is a diagram of example tree based LRU structures.

In another example, still referring to FIG. 7, a combination of (2-entity) and (4-entity) vectors are used to construct a different tree-based LRU scheme, as illustrated by tree structure 750 for an 8-way associative cache. In this example, tree structure 750 includes nodes 752, 754, and 756. Node 752 includes one bit chronology vector 758, while node 754 contains six bit chronology vector 760, and node 756 contains six bit chronology vector 762. These vectors are used to point to member positions A 764, B 766, C 768, D 770, E 772, F 774, G 776, and H 778.

Figure 8:
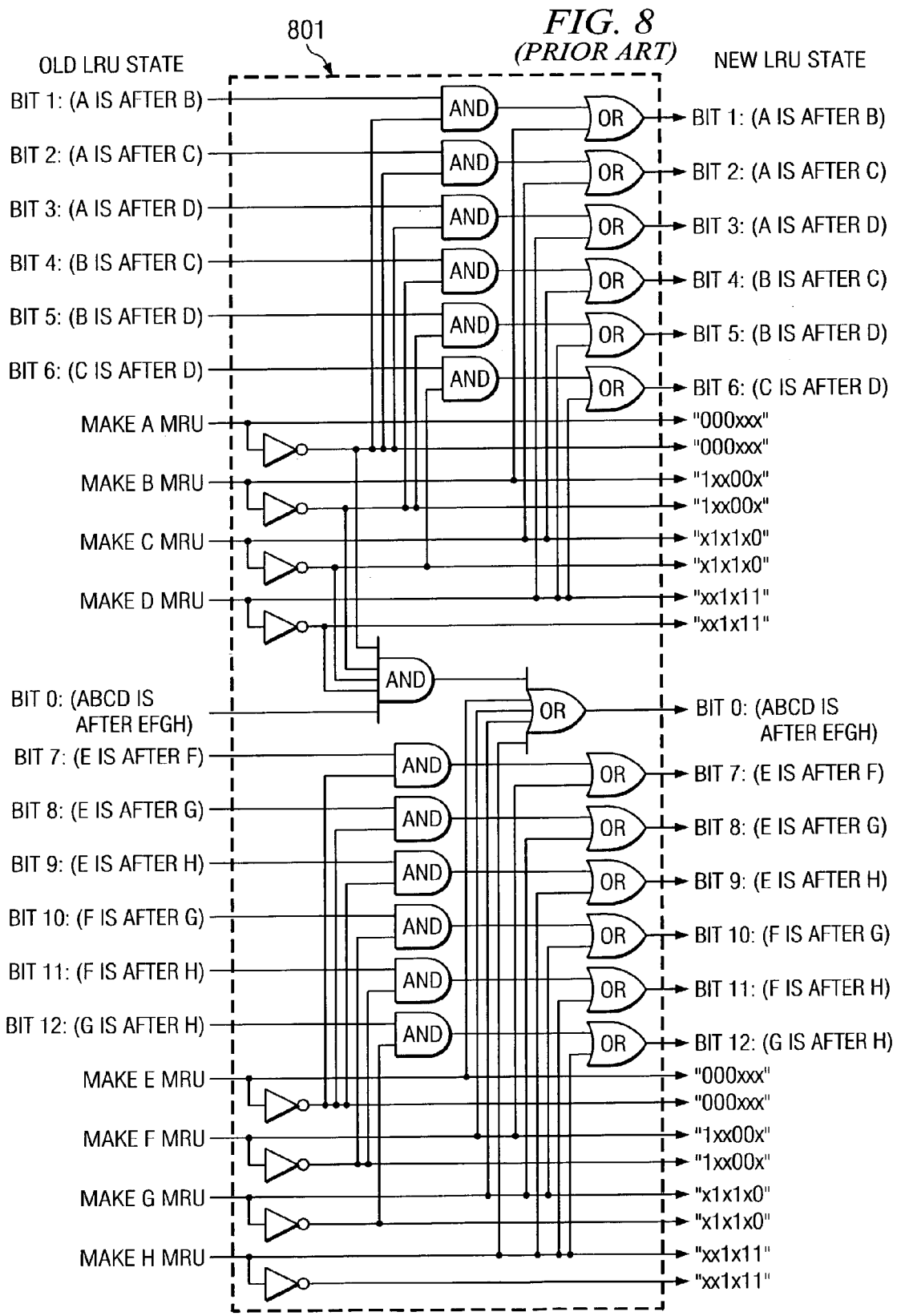
FIG. 8 is a circuit diagram of an MRU-update function.

Referring now to FIG. 8, a circuit diagram 801 illustrates the combination of varying size chronology vectors with a tree-based scheme embodied in an MRU-update function for the tree structure 750 shown in FIG. 7.

Figure 9A:
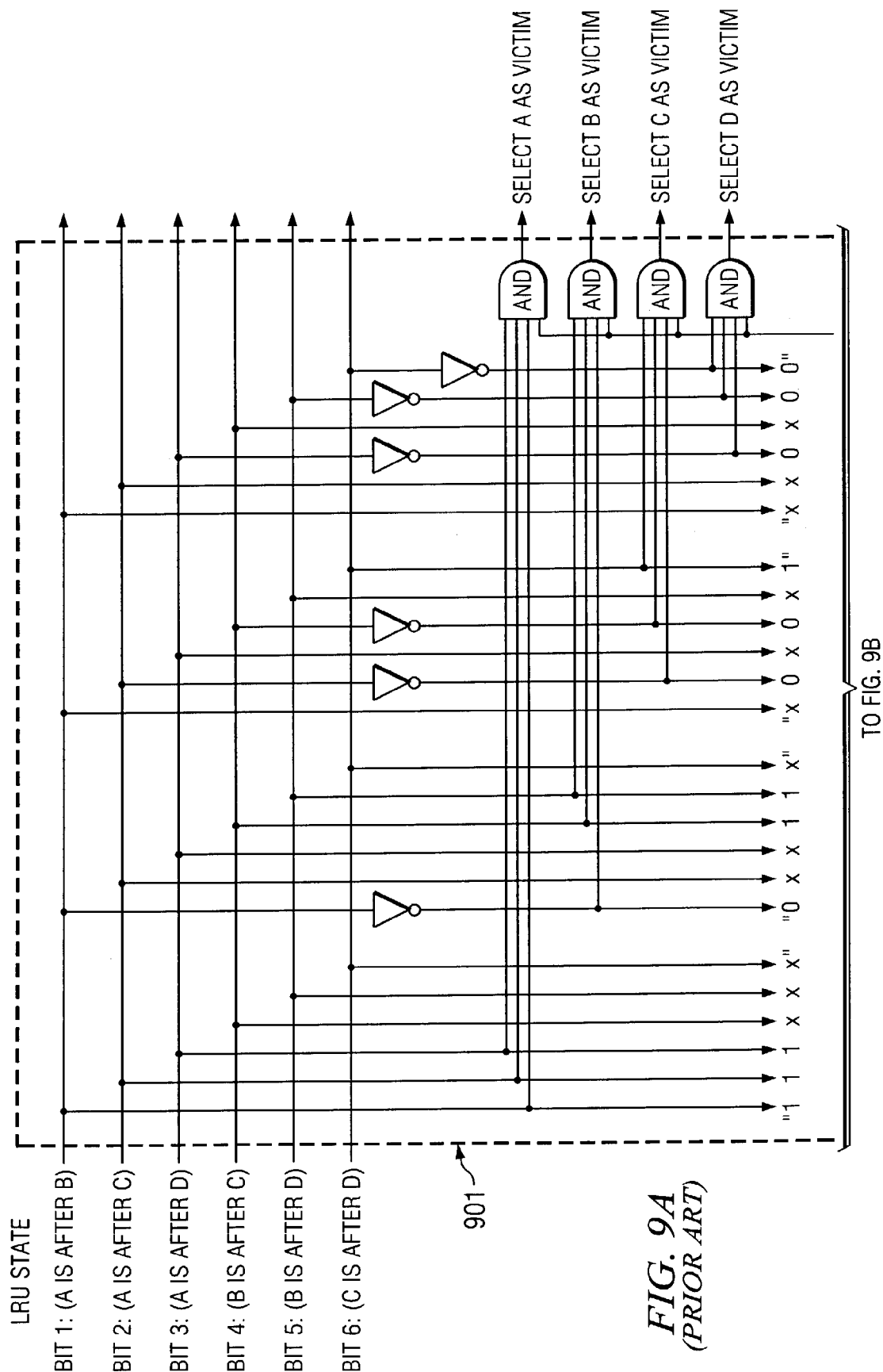
FIGS. 9A–9B is a circuit diagram of an LRU victim selection function.
Figure 9B:
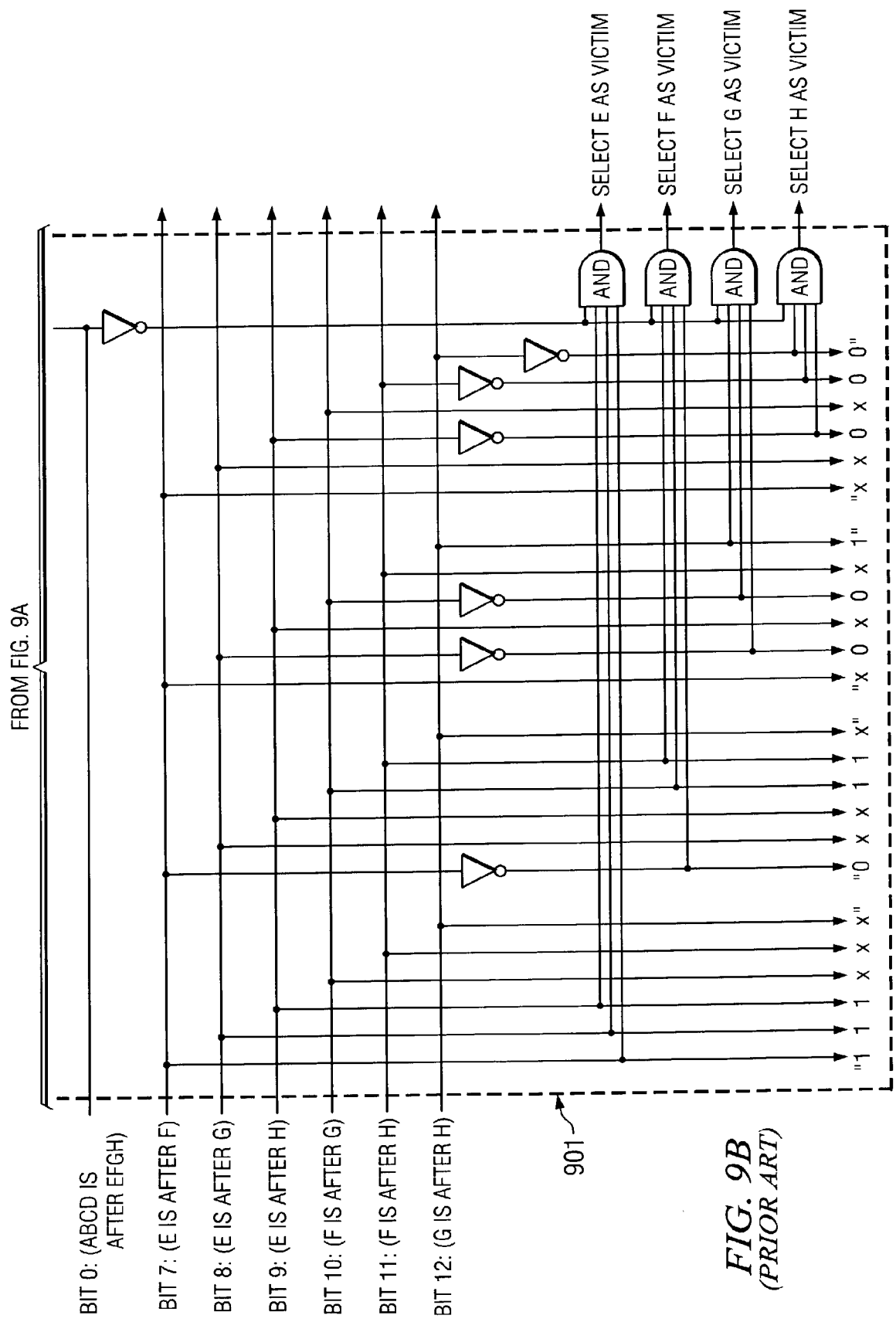

Referring now to FIGS. 9A–9B, a circuit diagram 901 illustrates the combination of varying size chronology vectors with a tree-based scheme embodied in an LRU victim selection function for the LRU tree 750 shown in FIG. 7.

Often, favorable operating characteristics and reduced complexity implementations for a cache can be achieved when the victim selection and state update portions of a cache allocation policy are tightly integrated with a common pipeline for accessing the cache arrays, directory arrays, and allocation policy (e.g. LRU) state arrays.

Further, in such implementations, further benefits are typically derived when the victim selection occurs as early as possible in the common pipeline, and when for each operational use of the pipeline, at most one cache allocation policy state update is performed.

Figure 10:
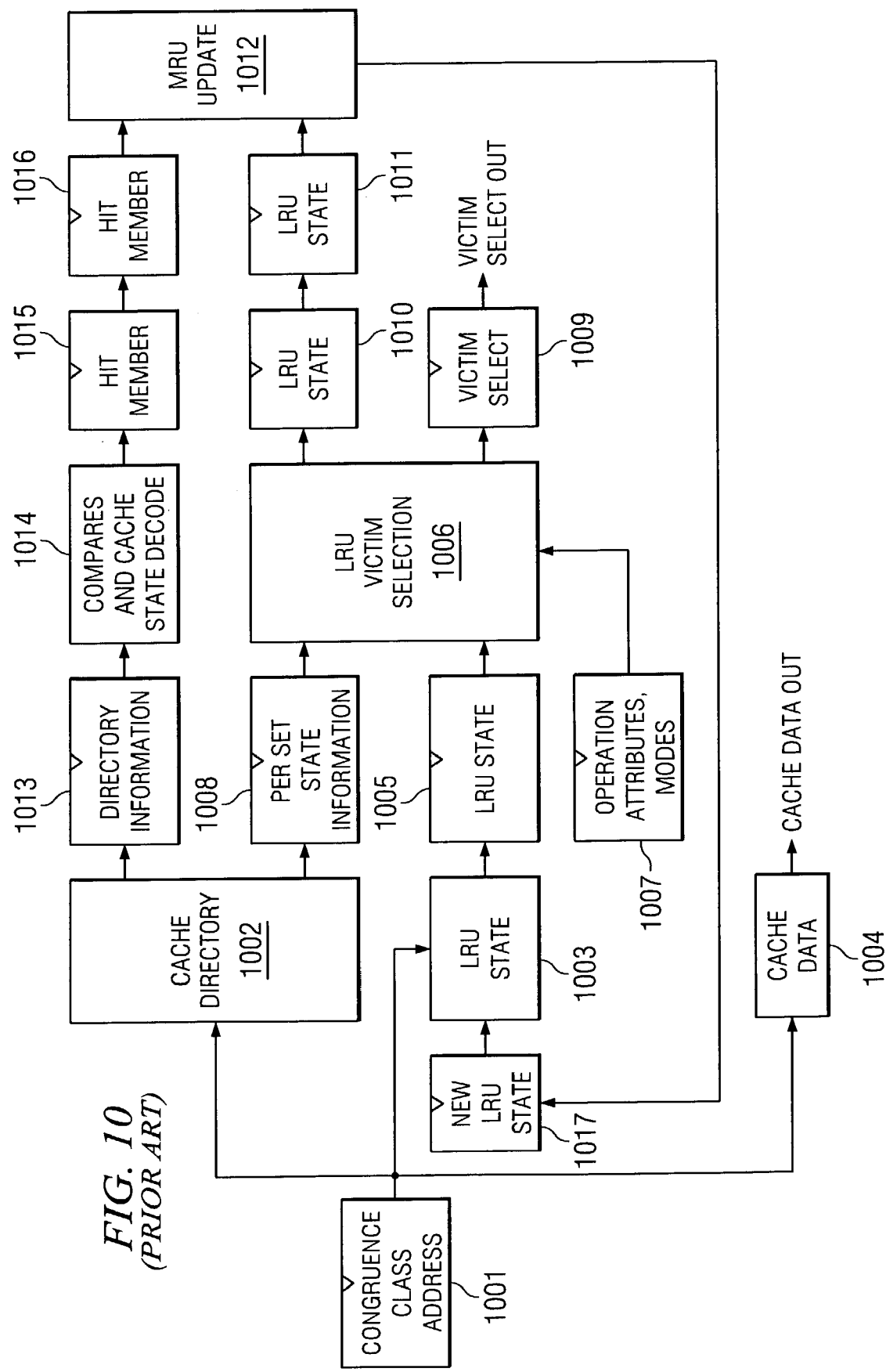
FIG. 10 is a diagram of a known cache architecture.

Referring now to FIG. 10, a cache architecture is illustrated. The cache congruence class index (or address) is held in latch 1001. From there, the address is simultaneously routed to the directory array 1002, the LRU state array 1003, and, for operations which speculatively read the cache, to the data array 1004.

From LRU state array 1003, the state information for the accessed congruence class is read and deposited into latch 1005. The state bits 0 through 12 of LRU tree 750, found in FIG. 7 are an example of such state information.

From staging latch 1005, the LRU state information is routed to least recently used (LRU) victim selection logic 1006, which is comprised largely of LRU victim selection logic such as that shown in circuit diagram 901, found in FIGS. 9A–9B. This logic always chooses a potential victim, whether one is needed or not. The selected victim member position is deposited in latch 1009. If selected victim was not needed, the LRU state will not be changed accordingly. This function will be described with the MRU update logic.

In addition to speculatively selecting a victim, victim selection logic 1006 also passes along some or all of the LRU state information to MRU update logic 1012, via pipelined latches 1010 and 1011. For implementations which cannot selectively write some bits to a given entry in LRU state array 1003, while leaving other bits in that entry unchanged, latches 1010 and 1011 must convey all the LRU state information (since all bits will be written when the array is updated). For implementations which can selectively write some bits to an entry in array 1003, while leaving other bits in that entry unchanged, latches 1010 and 1011 need only an indication of which member was selected as a victim.

Referring once again to FIG. 10, the least-recently-used victim selection logic 1006 may also be augmented by an invalid member select override policy. The invalid member select override policy makes use of cache member state information typically found in the cache directory 1002. A subset of the coherency state information (e.g., the valid bit) for all the members in the congruence class (indexed by 1001) is read from the directory 1002 and placed in latch 1008. From there, it is routed to the LRU victim select logic 1006, which may be augmented by an invalid member select override policy.

As indicated above, LRU victim selection logic 1006 may be augmented by partitioning a congruence class into multiple subclasses and restricting allocation to one or more subclasses, often based upon the attributes (e.g., instruction access, data access, which processor/thread) of the operation accessing the cache, or based upon mode switches.

A subset of the attributes of an operation and/or static mode switch settings are placed in latch 1007. From there, it is routed to LRU victim select logic 1006, which may be augmented by a set of operational modes and possibly by one or more congruence class partitioning policies, such as the one shown in FIG. 11.

Figure 11:
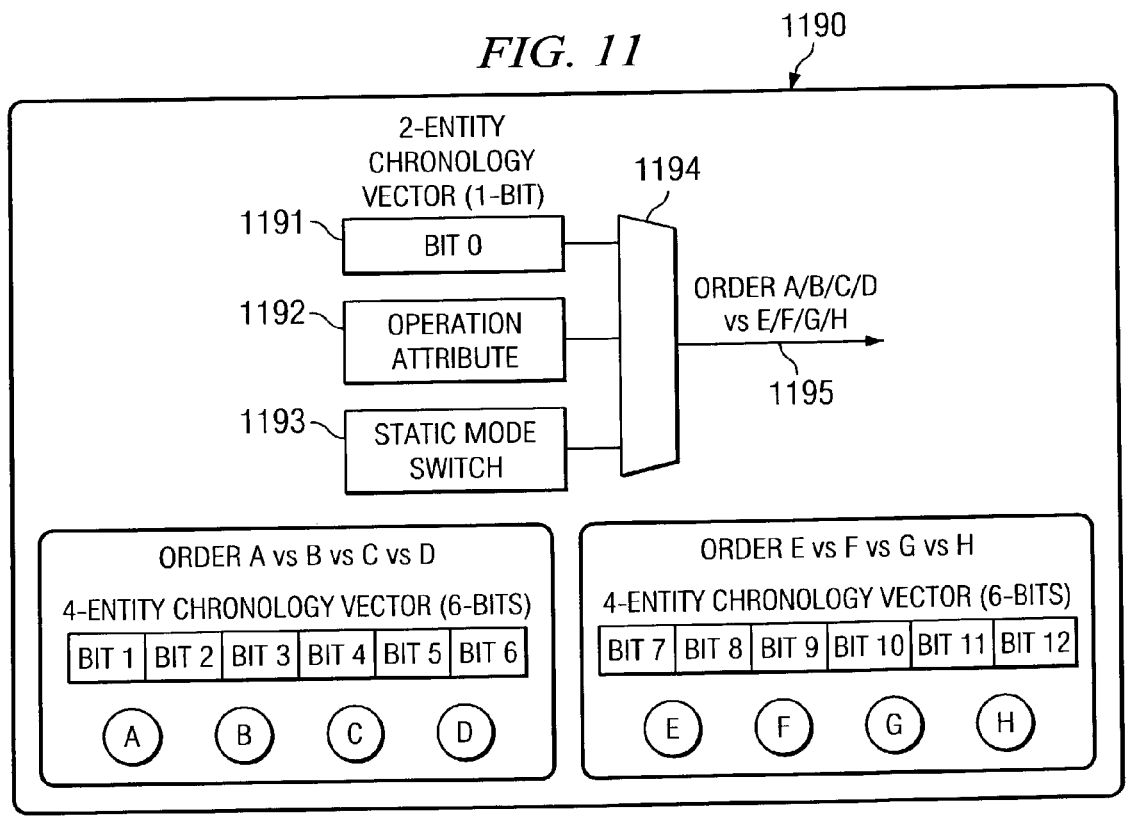
FIG. 11 is a diagram of a LRU tree with logic for incorporating a known, static congruence class partitioning scheme.

Referring now to FIG. 11, LRU tree 1190 illustrates a set of modifications to LRU tree 750 from FIG. 7. The modifications incorporate a mode switch 1193 which can be set to partition a congruence class between two types of operations for cache allocations. LRU Bit 0 1191, the root of the LRU tree 1190 feeds one leg of a 2-input multiplexer (MUX) 1194. A latched operation attribute 1192 (e.g., which of two processors from which the operation originated) feeds the other leg of MUX 1194. The mode switch 1193 steers the MUX 1194, and determines whether LRU history or an operation attribute will be used make the allocation choice between a member from A through D or a member from E through H.

The mechanisms of FIG. 11 are reflected in FIG. 10 as follows: LRU Bit 0 1191 is driven from latch 1005 to victim selection logic 1006. Both operation attribute 1192 and mode switch 1193 are driven from latch 1007 to victim selection logic 1006. MUX 1194 is incorporated in victim select logic 1006 prior to the incorporation of circuit diagram 901 from FIGS. 9A–9B.

Referring once again to FIG. 10, the MRU update logic 1012 receives a pipelined indication of which member was speculatively selected as a potential victim from staging latch 1011. Meanwhile, the contents of the associated congruence class lookup in the directory 1002 were latched 1013 and routed to the compare and decode logic 1014.

The compare and decode logic 1014 determines whether the operation is a cache hit, and if so, which member in the congruence class is the hit member. It also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1015, and pipelined forward to latch 1016, from with it is routed to the MRU update logic 1012.

In the MRU update logic 1012, the following information is collected for a given operation: whether or not an operation occurred (from latch 1016); if it occurred, whether the operation was a hit or miss (from latch 1016); if it was a hit, which member position contained the cache line that was hit (from latch 1016); if it was a miss, which member position was chosen to allocate the new cache line (from latch 1011).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1017, poised for writeback into the LRU state array 1003. For implementations which cannot selectively write some bits to a given entry in the LRU state array 1003, while leaving other bits in that entry unchanged, latch 1017 holds the entire contents of the entry to be written into the array. It must convey all the LRU state information (since all bits will be written when the array is updated). For implementations which can selectively write some bits to an entry in array 1003, while leaving other bits in that entry unchanged, latch 1017 consists of a write enable mask (indicating which bits of the entry will he written), as well as a vector of update bit values (for bits that will be written according to the mask).

The present invention provides a method and apparatus for managing cache lines in a data processing system. A special purpose register is employed in which this register may be manipulated by user code and operating system code to set preferences, such as a level 2 cache management policy preference for an application thread. These preferences may be dynamically set and an arbitration mechanism is employed to best satisfy preferences of multiple threads with a single aggregate preference. Members are represented using a least recently used tree. The least recent used tree has a set of nodes forming a path to member cache lines in a hierarchical structure. A state of a selected node is selectively biased within the set of nodes in the least recently used tree. At least one node on a level below the selected node is eliminated from being selected in managing the cache lines. In this manner, members can be biased against or for selection as victims when replacing cache lines in a cache memory.

Figure 14:
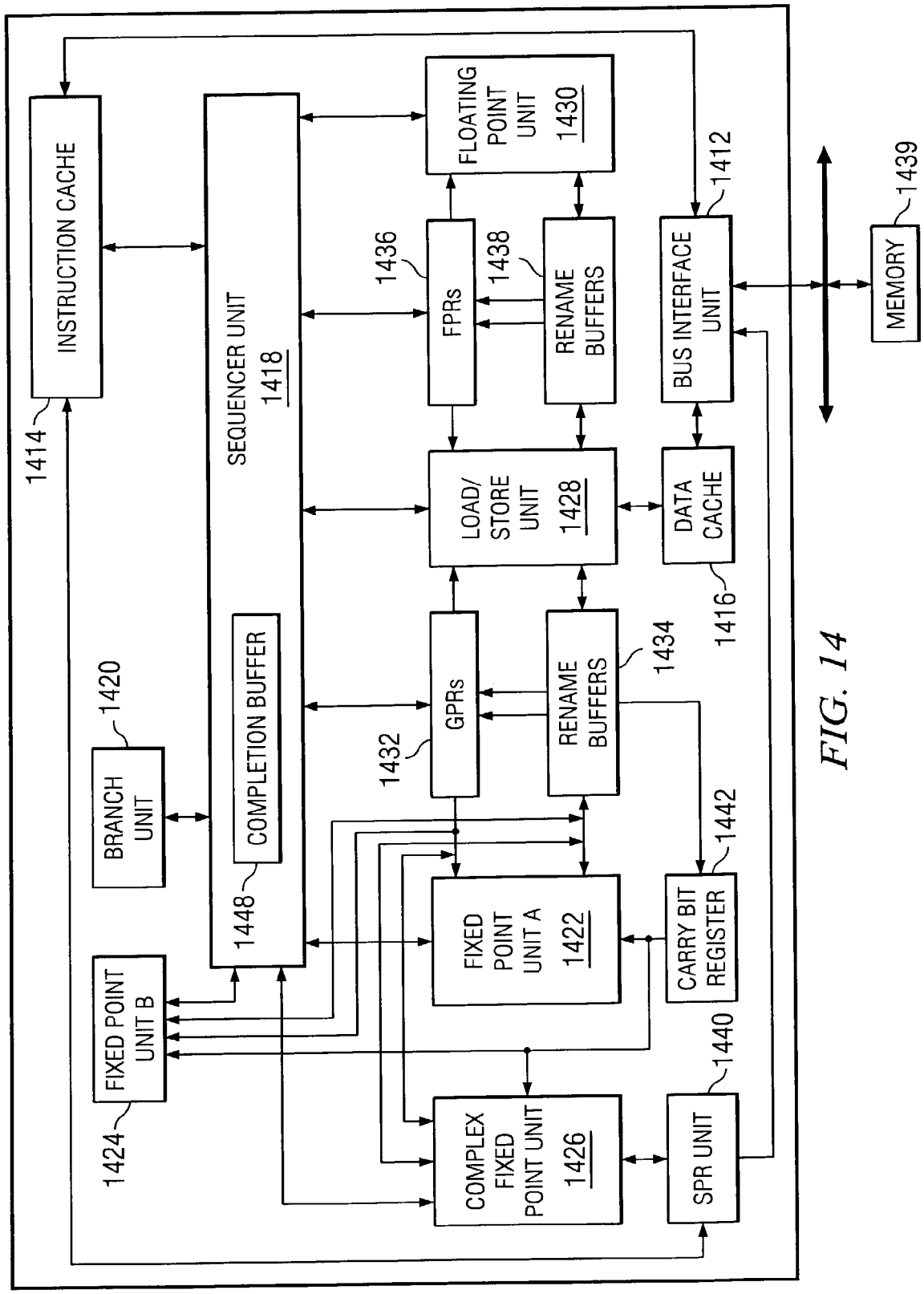
FIG. 14 is a block diagram of a processor system for processing information according to a preferred embodiment of the present invention.

FIG. 14 is a block diagram of a processor 1410 system for processing information in accordance with a preferred embodiment of the present invention. As discussed further herein below, processor 1410 includes various units, registers, buffers, memories, and other sections, all of which are formed by integrated circuitry. Also, in the preferred embodiment, processor 1410 operates according to reduced instruction set computer ("RISC") techniques. As shown in FIG. 14, a system bus 1411 is connected to a bus interface unit ("BIU") 1412 of processor 1410. BIU 1412 controls the transfer of information between processor 1410 and system bus 1411.

BIU 1412 is connected to an instruction cache 1414 and to a data cache 1416 of processor 1410. Instruction cache 1414 outputs instructions to a sequencer unit 1418. In response to such instructions from instruction cache 1414, sequencer unit 1418 selectively outputs instructions to other execution circuitry of processor 1410.

In addition to sequencer unit 1418, in the preferred embodiment, the execution circuitry of processor 1410 includes multiple execution units, namely a branch unit 1420, a fixed-point unit A ("FXUA") 1422, a fixed-point unit B ("FXUB") 1424, a complex fixed-point unit ("CFXU") 1426, a load/store unit ("LSU") 1428, and a floating-point unit ("FPU") 1430. FXUA 1422, FXUB 1424, CFXU 1426, and LSU 1428 input their source operand information from general-purpose architectural registers ("GPRs") 1432 and fixed-point rename buffers 1434. Moreover, FXUA 1422 and FXUB 1424 input a "carry bit" from a carry bit ("CA") register 1442. FXUA 1422, FXUB 1424, CFXU 1426, and LSU 1428 output results (destination operand information) of their operations for storage at selected entries in fixed-point rename buffers 1434. Also, CFXU 1426 inputs and outputs source operand information and destination operand information to and from special-purpose register processing unit ("SPR unit") 1440. The present invention introduces a new special purpose register into SPR unit 1440: a storage management preference register, which allows setting preferences used to bias cache management preferences by setting states for nodes in a LRU tree. The state is shadowed to a cache hierarchy in memory 1439 through bus interface unit 1412.

Since this new SPR is part of the application thread's architected state, it is naturally swapped in and out by the operating system task dispatcher during task context switches.

FPU 1430 inputs its source operand information from floating-point architectural registers ("FPRs") 1436 and floating-point rename buffers 1438. FPU 1430 outputs results (destination operand information) of its operation for storage at selected entries in floating-point rename buffers 1438.

In response to a Load instruction, LSU 1428 inputs information from data cache 1416 and copies such information to selected ones of rename buffers 1434 and 1438. If such information is not stored in data cache 1416, then data cache 1416 inputs (through BIU 1412 and system bus 1411) such information from a system memory 1439 connected to system bus 1411. Moreover, data cache 1416 is able to output (through BIU 1412 and system bus 1411) information from data cache 1416 to system memory 1439 connected to system bus 1411. In response to a Store instruction, LSU 1428 inputs information from a selected one of GPRs 1432 and FPRs 1436 and copies such information to data cache 1416.

Sequencer unit 1418 inputs and outputs information to and from GPRs 1432 and FPRs 1436. From sequencer unit 1418, branch unit 1420 inputs instructions and signals indicating a present state of processor 1410. In response to such instructions and signals, branch unit 1420 outputs (to sequencer unit 1418) signals indicating suitable memory addresses storing a sequence of instructions for execution by processor 1410. In response to such signals from branch unit 1420, sequencer unit 1418 inputs the indicated sequence of instructions from instruction cache 1414. If one or more of the sequence of instructions is not stored in instruction cache 1414, then instruction cache 1414 inputs (through BIU 1412 and system bus 1411) such instructions from system memory 1439 connected to system bus 1411.

In response to the instructions input from instruction cache 1414, sequencer unit 1418 selectively dispatches the instructions to selected ones of execution units 1420, 1422, 1424, 1426, 1428, and 1430. Each execution unit executes one or more instructions of a particular class of instructions. For example, FXUA 1422 and FXUB 1424 execute a first class of fixed-point mathematical operations on source operands, such as addition, subtraction, ANDing, ORing and XORing. CFXU 1426 executes a second class of fixed-point operations on source operands, such as fixed-point multiplication and division. FPU 1430 executes floating-point operations on source operands, such as floating-point multiplication and division.

As information is stored at a selected one of rename buffers 1434, such information is associated with a storage location (e.g. one of GPRs 1432 or CA register 1442) as specified by the instruction for which the selected rename buffer is allocated. Information stored at a selected one of rename buffers 1434 is copied to its associated one of GPRs 1432 (or CA register 1442) in response to signals from sequencer unit 1418. Sequencer unit 1418 directs such copying of information stored at a selected one of rename buffers 1434 in response to "completing" the instruction that generated the information. Such copying is called "writeback."

As information is stored at a selected one of rename buffers 1438, such information is associated with one of FPRs 1436. Information stored at a selected one of rename buffers 1438 is copied to its associated one of FPRs 1436 in response to signals from sequencer unit 1418. Sequencer unit 1418 directs such copying of information stored at a selected one of rename buffers 1438 in response to "completing" the instruction that generated the information.

Processor 1410 achieves high performance by processing multiple instructions simultaneously at various ones of execution units 1420, 1422, 1424, 1426, 1428, and 1430. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 1418 selectively inputs (from instruction cache 1414) one or more instructions from one or more memory addresses storing the sequence of instructions discussed further hereinabove in connection with branch unit 1420, and sequencer unit 1418.

In the decode stage, sequencer unit 1418 decodes up to four fetched instructions.

In the dispatch stage, sequencer unit 1418 selectively dispatches up to four decoded instructions to selected (in response to the decoding in the decode stage) ones of execution units 1420, 1422, 1424, 1426, 1428, and 1430 after reserving rename buffer entries for the dispatched instructions' results (destination operand information). In the dispatch stage, operand information is supplied to the selected execution units for dispatched instructions. Processor 1410 dispatches instructions in order of their programmed sequence.

In the execute stage, execution units execute their dispatched instructions and output results (destination operand information) of their operations for storage at selected entries in rename buffers 1434 and rename buffers 1438 as discussed further hereinabove. In this manner, processor 1410 is able to execute instructions out-of-order relative to their programmed sequence.

In the completion stage, sequencer unit 1418 indicates an instruction is "complete." Processor 1410 "completes" instructions in order of their programmed sequence.

In the writeback stage, sequencer 1418 directs the copying of information from rename buffers 1434 and 1438 to GPRs 1432 and FPRs 1436, respectively. Sequencer unit 1418 directs such copying of information stored at a selected rename buffer. Likewise, in the writeback stage of a particular instruction, processor 1410 updates its architectural states in response to the particular instruction. Processor 1410 processes the respective "writeback" stages of instructions in order of their programmed sequence. Processor 1410 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 1426) may require more than one cycle. Accordingly, a variable delay may occur between a particular instruction's execution and completion stages in response to the variation in time required for completion of preceding instructions.

A completion buffer 1448 is provided within sequencer 1418 to track the completion of the multiple instructions which are being executed within the execution units. Upon an indication that an instruction or a group of instructions have been completed successfully, in an application specified sequential order, completion buffer 1448 may be utilized to initiate the transfer of the results of those completed instructions to the associated general-purpose registers.

Figure 12:
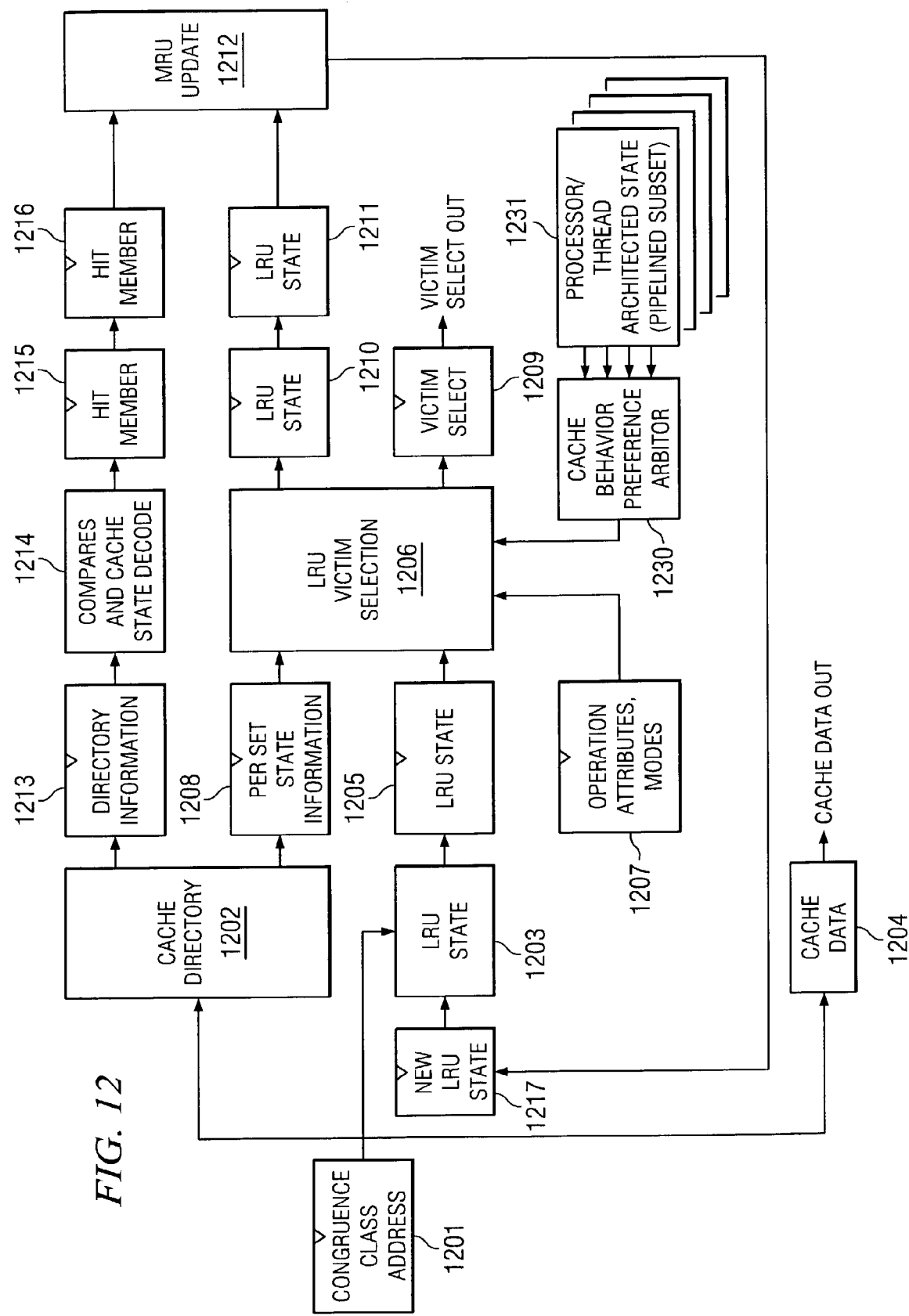
FIG. 12 is a diagram of a cache system in accordance with a preferred embodiment of the present invention.

Referring now to FIG. 12 a cache architecture used in a preferred embodiment of the present invention is shown. The cache congruence class index (or address) is held in latch 1201. From there, it is simultaneously routed to the directory array 1202, the LRU state array 1203, and, for operations which speculatively read the cache, to the data array 1204.

From LRU state array 1203, the state information for the accessed congruence class is read and deposited into latch 1205. The state bits 0 through 12 of LRU tree 750, found in FIG. 7 are an example of such state information.

From staging latch 1205, the LRU state information is routed to the victim selection logic 1206, which is comprised largely of LRU victim selection logic such as that shown in circuit diagram 901, found in FIGS. 9A–9B. This logic always chooses a potential victim, whether one is needed or not. The selected victim member position is deposited in latch 1209. If selected victim was not needed, the LRU state will not be changed accordingly. This function will be described with the MRU update logic.

In addition to speculatively selecting a victim, the victim selection logic 1206 also passes along some or all of the LRU state information to the MRU update logic, via pipelined latches 1210 and 1211. For implementations which cannot selectively write some bits to a given entry in the LRU state array 1203, while leaving other bits in that entry unchanged, latches 1210 and 1211 must convey all the LRU state information (since all bits will be written when the array is updated). For implementations which can selectively write some bits to an entry in array 1203, while leaving other bits in that entry unchanged, latches 1210 and 1211 need only an indication of which member was selected as a victim.

A central objective of the present invention is to augment the least-recently-used victim selection logic 1206 with a program controlled means of altering the selection policy. This is accomplished by passing a subset (e.g., one or more bits specifying the program's cache management preferences) of a processing thread's architected state 1231 (held in SPR Unit 1440 and passed via bus interface unit 1412 to cache hierarchy 1439, all shown in FIG. 14) to a block of preference arbitration logic 1230.

The preference arbitration logic 1230 weighs the preferences of each processing thread, and determines an aggregate preference that attempts to best satisfy the individual preferences. Numerous techniques, such as voting or averaging, may be applicable to this arbitration process. The best technique for a given embodiment is dictated by the specific nature of that embodiment.

The present embodiment provides each of two processing threads with the means to specify whether it prefers to partition the second level cache amongst threads or to shared the second level cache amongst threads. Given a default mode of partitioning the cache, the preference arbitration logic 1230 behaves as follows: If either of the processing threads specifies in its architected state 1231 a preference to partition the cache, the preference arbitration logic 1230 produces an aggregate preference to partition the cache. If both of the processing threads specify in their respective architected states 1231 a preference to share the cache, the preference arbitration logic 1230 produces an aggregate preference to share the cache.

The aggregate preference is routed to victim selection logic 1206. As described with FIG. 7, the attributes of a given operation, as well as any additional static mode switch settings are routed from latch 1207 to victim selection logic 1206.

Figure 13:
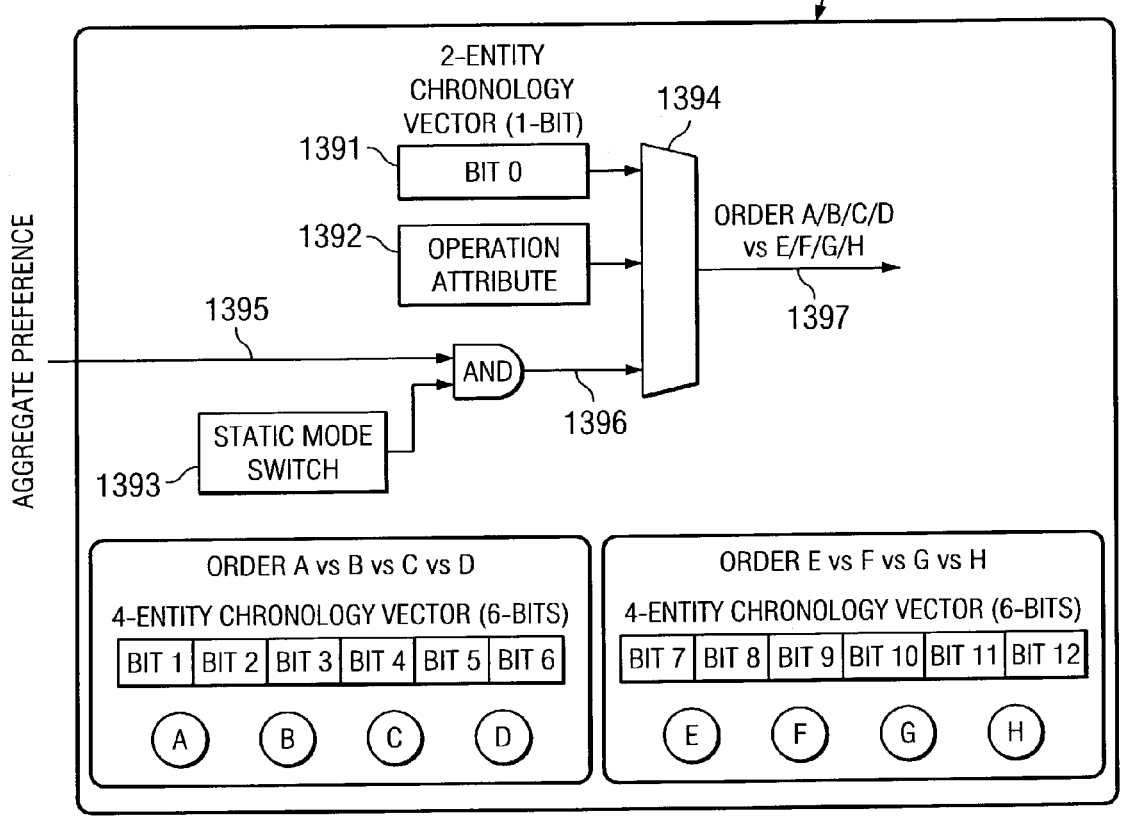
FIG. 13 is a diagram of a LRU tree with logic for setting preferences in accordance with a preferred embodiment of the present invention.

Victim selection logic 1206 is similar to that described with FIG. 7, but enhanced in a manner beyond what is described with FIG. 11, in accordance with the present invention, and shown in FIG. 13.

Referring now to FIG. 13, mode switch 1393 can be set to enable or disable aggregate preference 1395. The resulting signal 1396 determines whether or not to partition a congruence class between the two processing threads for cache allocations. LRU Bit 0 1391, the root of the LRU tree 1390 feeds one leg of a 2-input multiplexer (MUX) 1394. A latched operation attribute 1392 (i.e., which of two processors from which the operation originated) feeds the other leg of MUX 1394. The moded enabled aggregate preference 1396 steers the MUX 1394, and determines whether LRU history or processing thread will be used make the allocation choice between a member from A through D or a member from E through H.

Of particular note, since the aggregate preference is a function of architected state, which can be altered arbitrarily by programming, the victim allocation policy may also change arbitrarily. Such dynamic behavior introduces no undue functional or behavioral challenges, and requires no additional circuitry to minimize or prevent any ill consequences.

Referring once again to FIG. 12, the least-recently-used victim selection logic 1206 may also be augmented by an invalid member select override policy in the same manner described in FIG. 10. The mixture of the introduction of the present invention with the aforementioned invalid member select override policy introduces no notable complications.

Referring once again to FIG. 12, the MRU update logic 1212 receives a pipelined indication of which member was speculatively selected as a potential victim from staging latch 1211. Meanwhile, the contents of the associated congruence class lookup in the directory 1202 were latched 1213 and routed to the compare and decode logic 1214.

The compare and decode logic 1214 determines whether the operation is a cache hit, and if so, which member in the congruence class is the hit member. It also determines whether or not the operation must be aborted due to a collision with a protected resource, or due to a permission conflict between the operation type and the coherence state of the cache line.

The "hit member" information indicates one of the following: no operation occurred (either there was no operation at that time or the operation was aborted), a cache miss occurred, or a cache hit occurred against a given member position. The "hit member" information is deposited into latch 1215, and pipelined forward to latch 716, from with it is routed to the MRU update logic 1212.

In the MRU update logic 1212, the following information is collected for a given operation: whether or not an operation occurred (from latch 1216); if it occurred, whether the operation was a hit or miss (from latch 1216); if it was a hit, which member position contained the cache line that was hit (from latch 1216); if it was a miss, which member position was chosen to allocate the new cache line (from latch 1211).

If no operation occurred, the LRU state will remain unchanged. If a hit operation occurred, the LRU state will be updated such that the hit member position is established as MRU. If a miss operation occurred, the LRU state will be updated such that the allocated member position is established as MRU. Circuit diagram 801 in FIG. 8 shows an example implementation of this MRU update function.

The updated LRU state information is deposited in latch 1217, poised for writeback into the LRU state array 1203. For implementations which cannot selectively write some bits to a given entry in the LRU state array 1203, while leaving other bits in that entry unchanged, latch 1217 holds the entire contents of the entry to be written into the array. It must convey all the LRU state information (since all bits will be written when the array is updated). For implementations which can selectively write some bits to an entry in array 1203, while leaving other bits in that entry unchanged, latch 1217 consists of a write enable mask (indicating which bits of the entry will be written), as well as a vector of update bit values (for bits that will be written according to the mask).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for managing cache lines, the method comprising:
   representing members using a least recently used tree, wherein the least recently used tree has a set of nodes forming a paths to member cache lines in a hierarchical structure; and
   selectively biasing a state of a selected node within the set of nodes in the least recently used tree, wherein at least one node on a level below the selected nods is eliminated from being selected in managing the cache lines, wherein the state is selectively biased using at least one preference that is dynamically set.

2. The method of claim 1, wherein a particular node in the least recently used tree is defined using a single bit chronology vector.

3. The method of claim 1, wherein a particular node in the least recent used tree is defined using a four bit chronology vector.

4. The method of claim 1, wherein a state of the selected node is set based on a processor type in the data processing system.

5. The method of claim 1, wherein a state of the selected node is set based on an operating system type in the data processing system.

6. The method of claim 1, wherein the selected node is a node on a level just above a member in the member cache lines.

7. The method of claim 1, wherein the selected node is a top most node in the least recently used tree.

8. The method of claim 1, wherein the state of the selected node is biased in response to a miss in a cache and wherein the state of the selected node is biased such that at least one member cache line is less likely to be selected as a victim for substitution.

9. A data processing system for managing cache lines, the data processing system comprising:
   representing means for representing member cache lines using a least recently used tree, wherein the least recently used tree has a set of nodes forming a paths to to member cache lines in a hierarchical structure; and
   biasing means selectively biasing a state of a selected node within the set of nodes in the least recently used tree, wherein at least one node on a level below the selected node is eliminated from being selected in managing the member cache lines, wherein the state is selectively biased using at least one preference that is dynamically set.

10. The data processing system of claim 9, wherein a particular node in the least recently used tree is defined using a single bit chronology vector.

11. The data processing system of claim 9, wherein a particular node in the least recently used tree is defined using a four bit chronology vector.

12. The data processing system of claim 9, wherein a state of the selected node is set based on a processor type in the data processing system.

13. The data processing system of claim 9, wherein a state of the selected node is set based on an operating system type in the data processing system.

14. The data processing system of claim 9, wherein the selected node is a node on a level just above a member in the member cache lines.

15. The data processing system of claim 9, wherein the selected node is a top most node in the least recently used tree.

16. The data processing system of claim 9, wherein the state of the selected node is biased in response to a miss in a cache and wherein the state of the selected node is biased such that at least one member cache line is less likely to be selected as a victim for substitution.

17. A data processing system for managing cache lines, the data processing system comprising:
   logic device, wherein the logic device represents member cache lines using a least recently used tree, wherein the least recently used tree has a set of nodes forming a paths to the member cache lines in a hierarchical structure; and
   circuit connected to the logic device, wherein the circuit selectively biases a state of a selected node within the set of nodes in the least recently used tree, wherein at least one node on a level below the selected node is eliminated from being selected in managing the cache lines wherein the state is selectively biased using at least one preference that is dynamically set.

18. The data processing system of claim 17, wherein a particular node in the least recently used tree is defined using a single bit chronology vector.

19. The data processing system of claim 17, wherein a particular node in the least recently used tree is defined using a four bit chronology vector.

20. The data processing system of claim 17, wherein a state of the selected node is set based on a processor type in the data processing system.

21. The data processing system of claim 17, wherein a state of the selected node is set based on an operating system type in the data processing system.

22. The data processing system of claim 17, wherein the selected node is a node on a level just above a member in the member cache lines.

23. The data processing system of claim 17, wherein the selected node is a top most node in the least recently used tree.

24. The data processing system of claim 17, wherein the state of the selected node is biased in response to a miss in a cache and wherein the state of the selected node is biased such that at least one member cache line is less likely to be selected as a victim for substitution.

25. A computer program product in a computer readable medium for managing cache lines, the method comprising:
   first instructions for representing members using a least recently used tree, wherein the least recently used tree has a set of nodes forming a pats to member cache lines in a hierarchical structure; and
   second instructions for selectively biasing a state of a selected node within the set of nodes in the least recently used tree, wherein at least one node on a level below the selected node is eliminated from being selected in managing the cache lines, wherein the state is selectively biased using at least one preference that is dynamically set.

* * * * *